# United States Patent Office 3,420,684
Patented Jan. 7, 1969

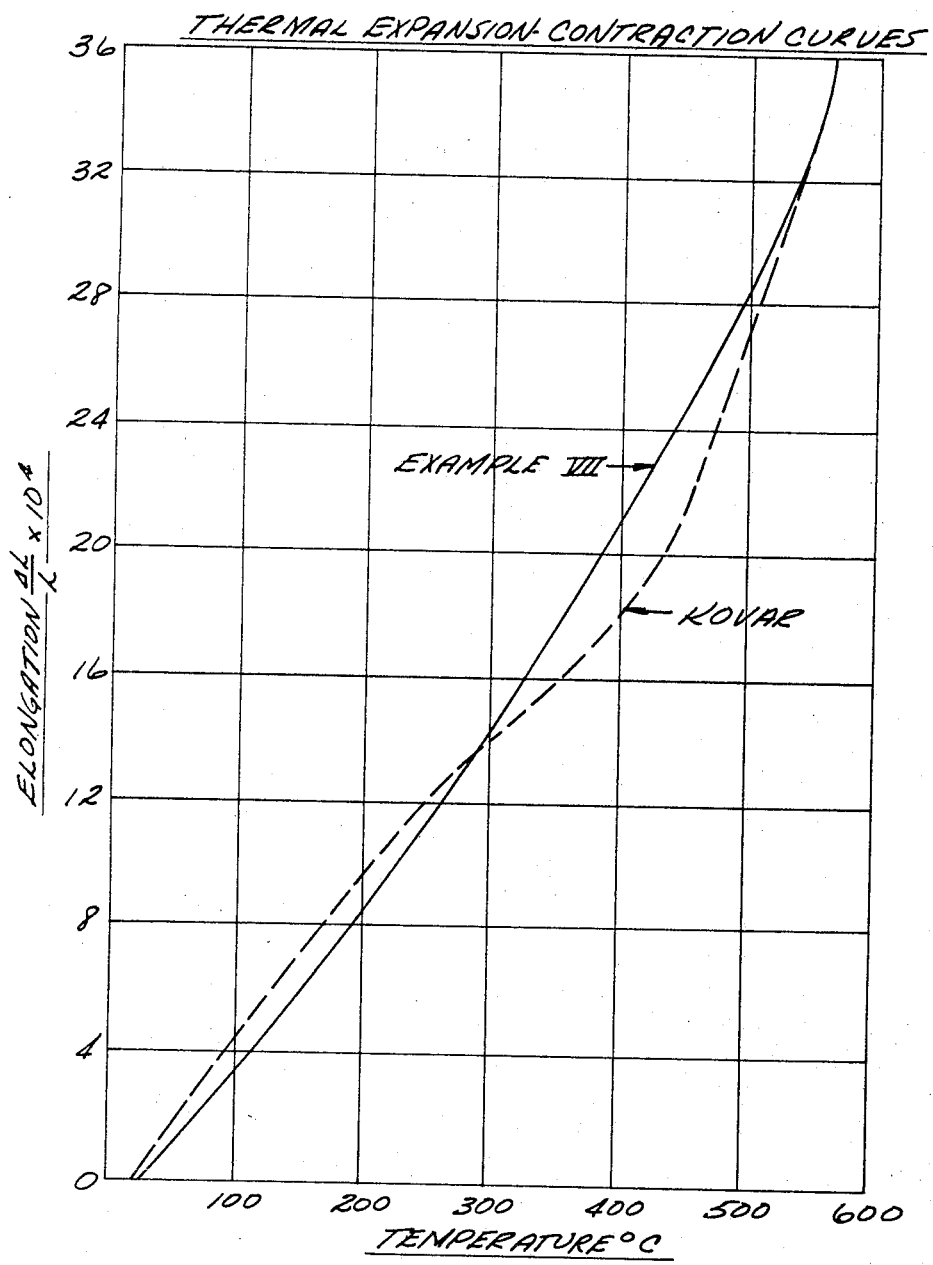

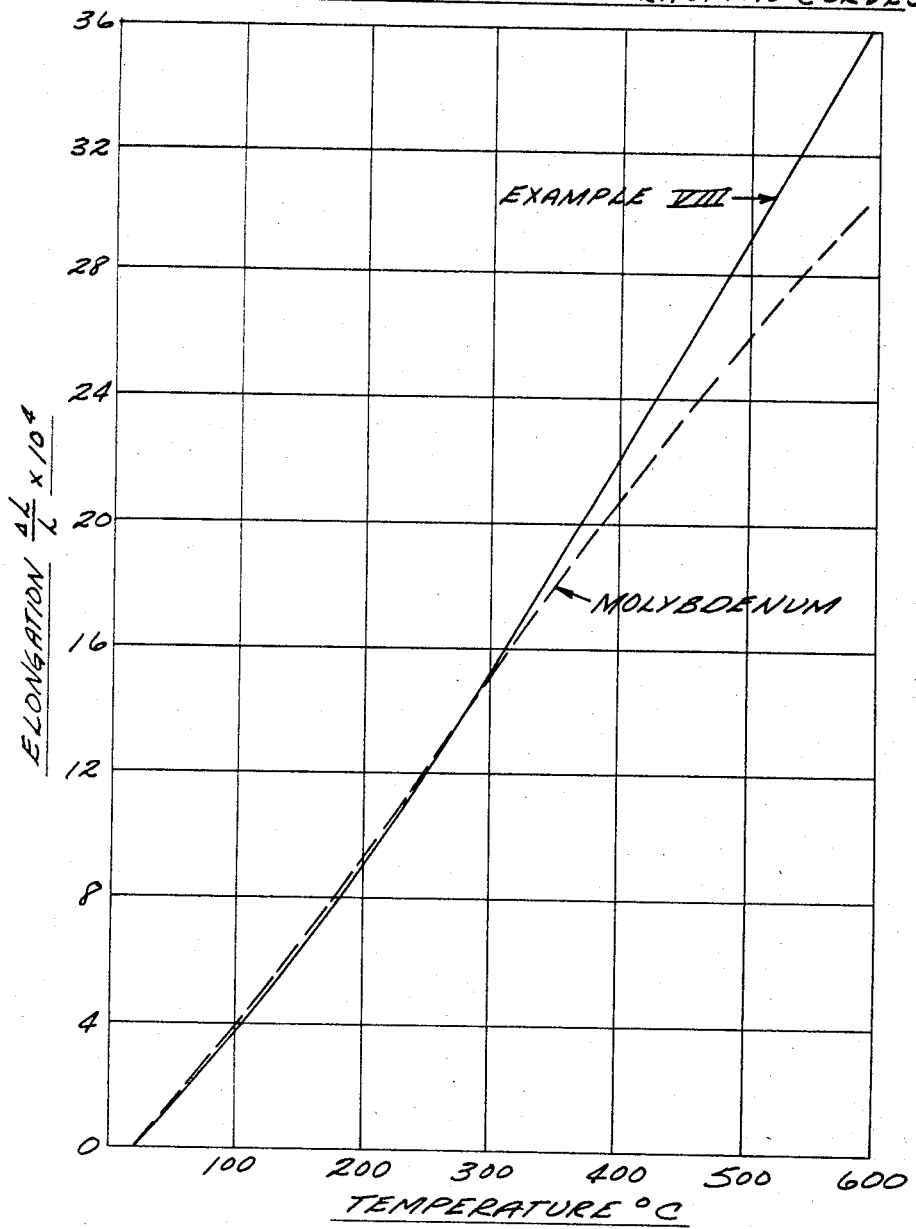

3,420,684
SEALING GLASS COMPOSITIONS, METHOD OF SEALING, AND ARTICLE
Erwin C. Hagedorn, Oregon, Ohio, assignor to Owens-Illinois Inc., a corporation of Ohio
Filed June 19, 1964, Ser. No. 376,592
U.S. Cl. 106—54  15 Claims
Int. Cl. C03c 3/08; C03c 7/02

ABSTRACT OF THE DISCLOSURE

Sealing glasses free of sodium oxide and potassium oxide for sealing to glass and metal, including metal alloys, consisting essentially of, in parts by weight:

| | Percent |
|---|---|
| $SiO_2$ | 46–56 |
| $Al_2O_3$ | 12–18 |
| CaO | 7–15 |
| MgO | 5–11 |
| $Li_2O$ | 2–3.5 |
| $B_2O_3$ | 8–18 |
| $F_2$ | 0–0.7 | and articles having at least one metal surface sealed therewith.

---

This invention relates to glass compositions having desirable thermal expansion characteristics, good viscosity properties and good chemical durability, which are valuable for use as sealing glasses and for fabrication of glass articles. More particularly, the glasses of the present invention are soda and potash free, borosilicate glass compositions which are particularly suitable for sealing to various metals including alloys. The present invention further pertains to methods for sealing metal surfaces.

It is desirable to possess glass compositions which can be utilized for drawing into various glass articles as well as for sealing purposes so that the glass can be used for sealing, packaging and encapsulating electrical parts and equipment and the like. Heretofore, various glass compositions that have been satisfactory for the production of small glass containers have possessed poor properties for sealing purposes and moreover have deleteriously affected certain delicate materials which have been packaged or sealed therein. Illustrative of such deleterious effects is the "poisoning" effect which glasses containing alkali oxides such as potassium and sodium have on certain electrical parts thus prohibiting the use of such glasses for packaging and/or sealing these articles.

In sealing various metal surfaces, it is important to have good stability so as to resist devitrification in the course of sealing or during subsequent treatments of the sealed metal part. Furthermore, once the metal has been sealed, the glass should resist in a satisfactory manner any chemical attack which may result from exposure to the solvent effect of water and other aqueous solutions, particularly those of an acidic nature.

Among the desirable properties of a glass composition intended for the purposes mentioned above, is a relatively high viscosity at the liquidus temperature which enhances the stability of the glasses. This property enables the glass compositions to be used in the fabrication of various articles such as tubing, which is drawn and worked, without the danger of crystallization or devitrification.

In addition to having good stability, and to assure that a good seal is obtained, it is important that the sealing glasses possess a coefficient of thermal expansion that approximates, as closely as possible, that of the metal to which it is sealed. If the rates of thermal expansion are significantly different, a satisfactory bond may not be maintained upon cooling the seal when first made and the bond between the glass and metal, if initially satisfactory, can fail later as a result of temperature fluctuations.

In the past, metals such as molybdenum, alloys of molybdenum, iron-nickel-cobalt alloys (Kovar) and Rodar have presented problems with respect to sealing to glass and the glass compositions used for sealing to these metals have not been completely free of shortcomings regarding stability, durability and adhesion.

For example, prior glass compositions that are free of $Na_2O$ and $K_2O$ generally have high liquidus temperatures with low viscosity at the liquidus temperature so that these glasses are not suitable for glass forming operations, such as glass tubing and rod manufacture, in view of their ease of devitrification and, of course, are also unsuitable as sealing glasses because this ease of devitrification is only avoided by sealing at a sufficiently high temperature which would be undesirable or destructive as regards one or more components being sealed.

Reference has already been made to the deleterious poisoning effect resulting in sealed electrical parts such as vacuum tubes that are sealed by using glass compositions containing alkali metal oxides. Thus the sealing glasses used in the past have a number of shortcomings and drawbacks associated therewith which has prompted further attempts to reduce or eliminate the disadvantages.

Accordingly, it is an object of the present invention to provide new and improved glass compositions characterized by desirable thermal expansion characteristics, relatively high viscosity at the liquidus temperature, good chemical durability and stability and which are particularly suitable for sealing to glass and metal surfaces while avoiding the disadvantages and drawbacks of the prior known compositions and methods.

It is a further object of the present invention to provide sealing glass compositions, free of sodium and potassium oxides, having a relatively high viscosity at the liquidus temperature and which have excellent stability and resist devitrification in normal use.

It is another object of the present invention to provide glass compositions that will form stable and effective seals to metals.

It is a further object of the present invention to provide methods for sealing glass to metal surfaces employing chemically durable and stable sealing glass compositions which do not deleteriously affect the sealed article.

In attaining the above objects one feature of the present invention resides in glass compositions that are free from the usual alkali metal oxides, namely, sodium oxide and potassium oxide. Glasses of the present invention are characterized by improved chemical durability and are free from the undesirable effects which accompany conventional glasses which contain the above two alkali metal oxides.

A further feature of the present invention resides in the sealing glass compositions containing lithium oxide, $Li_2O$, which results in a stable glass free of the tendency to devitrify in use and which enables the glass compositions to be used for purposes such as sealing to metals where previously employed sealing glasses have been unsatisfactory.

Other objects, features and advantages of the present invention will become apparent from the following detailed description thereof taken in conjunction with the drawings, wherein:

FIGURE 1 shows the thermal expansion curve for the sealing glass of Example VII in the solid line, and the thermal expansion curve of Kovar metal in the broken line; and FIGURE 2 shows the thermal expansion curve for the sealing glass of Example VIII in the solid line, and the thermal expansion curve of molybdenum in the broken line.

According to the present invention a glass composition is provided which contains no sodium or potassium oxides usually contained in prior known glass compositions which have adversely affected certain sealed metal articles. Glass compositions of the present invention because of their excellent thermal characteristics are particularly suitable for sealing purposes, including sealing to many metals and alloys. Moreover, because of the high viscosity at the liquidus temperatures and improved chemical durability, the glasses of the present invention are excellent for fabrication of tubing and other drawn material.

The glasses of the present invention consist essentially of, in parts by weight:

| | Percent |
|---|---|
| $SiO_2$ | 46–56 |
| $Al_2O_3$ | 12–18 |
| CaO | 7–15 |
| MgO | 5–11 |
| $Li_2O$ | 2–3.5 |
| $B_2O_3$ | 8–18 |
| $F_2$ | 0–0.7 |

The glasses of the present invention generally have a fiber softening temperature which ranges from about 700° C. to about 780° C. The coefficient of thermal expansion of the glasses of the present invention ranges from about $42 \times 10^{-7}$ to about $62 \times 10^{-7}$ cm. per cm. per degrees C. (0–300° C.).

In carrying out the methods of the present invention it is found to be unnecessary to prepare the surface of metals such as molybdenum and various alloys. The glass is melted and coated over the metal surface or in the alternative, the glass can be in powder form and coated on the surface of the metal to be sealed and thereafter the seal assembly exposed to elevated temperature under suitable conditions employing either an oven or furnace infrared heat, or any other conventional method of heating to melt the glass powder and thereby seal the metal surface therewith. The glass compositions of the present invention have been particularly useful for the encapsulation of certain electrical circuits and parts where heretofore the sealing glasses containing potassium oxide and/or sodium oxide have deleteriously affected such sealed parts so as to make them unsatisfactory for the purposes intended.

It is to be understood that, in addition to the components specified in the various compositions, the glasses may in certain cases contain trace impurities derived from impurities in raw materials used in the manufacture of the glass. Coloring matter may also be deliberately added to the glass compositions if so desired.

As set forth herein, the various components are expressed in terms of their oxides although in preparing the sealing glasses, the components may be added in various forms. For obtaining compositions as defined herein it will be necessary to take into account losses due to volatilization and the like. Thus, the composition of the starting batch is adjusted accordingly.

For the manufacture of a sealing glass according to the present invention, the batch can be prepared from the various ingredients commonly used in the art for providing the constituent oxides in their required amounts.

The following examples serve to illustrate the present invention but are not considered limiting thereof in any way.

EXAMPLE I

A glass composition containing the following ingredients, in percent by weight, was prepared:

| | Percent |
|---|---|
| $SiO_2$ | 53.42 |
| $Al_2O_3$ | 13.50 |
| CaO | 11.92 |
| MgO | 8.51 |
| $Li_2O$ | 2.68 |
| $B_2O_3$ | 10.00 |

Liquidus temperature _____ ° F__ 2000
Fiber softening point _____ ° C__ 736
Coefficient of thermal expansion
  (0–300° C.) _____ $56.7 \times 10^{-7}$
A.P. _____ ° C__ 580

EXAMPLE II

A glass composition was prepared containing the following ingredients in percent by weight:

| | |
|---|---|
| $SiO_2$ | 48.42 |
| $Al_2O_3$ | 13.50 |
| CaO | 11.92 |
| MgO | 8.51 |
| $Li_2O$ | 2.68 |
| $B_2O_3$ | 15.00 |

Liquidus temperature _____ ° F__ 1895
Coefficient of thermal expansion
  (0–300° C.) _____ $57.0 \times 10^{-7}$
Annealing point _____ ° C__ 580
Fiber softening point _____ ° C__ 723

EXAMPLE III

A glass composition was prepared containing the following ingredients in percent by weight:

| | |
|---|---|
| $SiO_2$ | 47.92 |
| $Al_2O_3$ | 13.50 |
| CaO | 11.92 |
| MgO | 8.51 |
| $Li_2O$ | 3.18 |
| $B_2O_3$ | 15.0 |

Liquidus temperature _____ ° F__ 1890
Coefficient of thermal expansion
  (0–300° C.) _____ $58.2 \times 10^{-7}$
Annealing point _____ ° C__ 567
Fiber softening point _____ ° C__ 710

EXAMPLE IV

A glass composition was prepared containing the following ingredients in percent by weight:

| | |
|---|---|
| $SiO_2$ | 52.92 |
| $Al_2O_3$ | 13.50 |
| CaO | 11.92 |
| MgO | 8.51 |
| $Li_2O$ | 3.18 |
| $B_2O_3$ | 10.00 |

Liquidus temperature _____ ° F__ 1980
Coefficient of thermal expansion
  (0–300° C.) _____ $58.0 \times 10^{-7}$
Annealing point _____ ° C__ 574
Fiber softening point _____ ° C__ 727

EXAMPLE V

A glass composition was prepared containing the following ingredients in percent by weight:

| | |
|---|---|
| $SiO_2$ | 53.13 |
| $Al_2O_3$ | 13.50 |
| CaO | 8.78 |
| MgO | 6.45 |
| $Li_2O$ | 2.68 |
| $B_2O_3$ | 15.0 |
| $F_2$ | 0.50 |

Liquidus temperature _____ ° F__ 1815
Fiber softening point _____ ° C__ 726

EXAMPLE VI

A glass composition of the following ingredients was prepared wherein the weight is in percent by weight:

| | |
|---|---|
| $SiO_2$ | 50.13 |
| $Al_2O_3$ | 15.0 |
| CaO | 8.98 |

| | |
|---|---|
| MgO | 6.45 |
| Li$_2$O | 2.68 |
| B$_2$O$_3$ | 16.50 |
| F$_2$ | 0.50 |
| Fiber softening point °C | 720 |
| Annealing point °C | 560 |
| Liquidus temperature (942° C.) °F | 1728 |
| Coefficient of thermal expansion (0–300° C.) | 50.8×10$^{-7}$ |

EXAMPLE VII

A glass composition containing the following ingredients in percent by weight was prepared:

| | |
|---|---|
| SiO$_2$ | 49.81 |
| Al$_2$O$_3$ | 15.00 |
| CaO | 8.98 |
| MgO | 6.42 |
| Li$_2$O | 3.00 |
| B$_2$O$_3$ | 16.50 |
| F$_2$ | 0.50 |
| Fiber softening point °C | 709 |
| Annealing point °C | 552 |
| Liquidus temperature °C | 938 |
| Log viscosity at liq. temp. | 4.2 |
| Coefficient of thermal expansion (0–300° C.) | 51.1×10$^{-7}$ |

EXAMPLE VIII

A glass composition was prepared containing the following ingredients in percent by weight:

| | |
|---|---|
| SiO$_2$ | 55.02 |
| Al$_2$O$_3$ | 17.26 |
| CaO | 9.26 |
| MgO | 7.31 |
| Li$_2$O | 2.18 |
| B$_2$O$_3$ | 9.00 |
| F$_2$ | 0.016 |
| Fiber softening point °C | 772 |
| Annealing point °C | 592 |
| Liquidus temperature °C | 1060 |
| Log viscosity at liq. temp. | 3.7 |
| Coefficient of thermal expansion (0–300° C.) | 43×10$^{-7}$ |

The compositions described in Examples VIII and IX are preferred according to the present invention since these glasses exhibit unusually good working properties and have especially good chemical durability making them valuable for sealing to molybdenum and molybdenum alloys.

In FIGURE 1, the solid line curve shows the thermal expansion characteristics of the sealing glass of Example VII, which is particularly useful for sealing to Kovar metal. The broken line curve shows that the thermal expansion for Kovar metal is somewhat irregular and is therefore difficult to match with most glasses.

In FIGURE 2, the solid line shows the thermal expansion characteristics of the sealing glass of Example VIII, which is particularly useful for sealing to molybdenum. It is apparent that the curve for this sealing glass and the broken line showing thermal expansion for molybdenum almost coincide between 0° C. to 300° C.

I claim:

1. A sealing glass free of sodium oxide and potassium oxide for sealing to glass and metal consisting essentially of, in parts by weight:

| | Percent |
|---|---|
| SiO$_2$ | 46–56 |
| Al$_2$O$_3$ | 12–18 |
| CaO | 7–15 |
| MgO | 5–11 |
| Li$_2$O | 2–3.5 |
| B$_2$O$_3$ | 8–18 |
| F$_2$ | 0–0.7 |

2. A sealing glass composition as defined in claim 1 wherein the thermal coefficient of expansion of the glass is in the range of from about 42×10$^{-7}$ to about 62×10$^{-7}$ and the fiber softening point in the range of about 700° C. to about 780° C.

3. A sealing glass free of sodium oxide and potassium oxide for sealing to glass and metal consisting essentially of:

| | Percent |
|---|---|
| SiO$_2$ | 48.42 |
| Al$_2$O$_3$ | 13.5 |
| CaO | 11.92 |
| MgO | 8.51 |
| Li$_2$O | 2.68 |
| B$_2$O$_3$ | 15 | wherein the coefficient of thermal expansion of said glass being 57×10$^{-7}$ and the said glass composition having a fiber softening temperature of about 723° C.

4. A sealing glass free of sodium oxide and potassium oxide for sealing to glass and metal consisting essentially of:

| | Percent |
|---|---|
| SiO$_2$ | 49.81 |
| Al$_2$O$_3$ | 15 |
| CaO | 8.98 |
| MgO | 6.42 |
| Li$_2$O | 3 |
| B$_2$O$_3$ | 16.5 |
| F$_2$ | 0.50 | the coefficient of thermal expansion of said glass being 51.1×10$^{-7}$ and the fiber softening temperature of 709° C.

5. A sealing glass free of sodium oxide and potassium oxide for sealing to glass and metal consisting essentially of:

| | Percent |
|---|---|
| SiO$_2$ | 55.02 |
| Al$_2$O$_3$ | 17.26 |
| CaO | 9.26 |
| MgO | 7.31 |
| Li$_2$O | 2.18 |
| B$_2$O$_3$ | 9 |
| F$_2$ | 0.016 | said glass having a fiber softening temperature of about 772° C. and a coefficient of thermal expansion of 43×10$^{-7}$.

6. A sealing glass free of sodium oxide and potassium oxide for sealing to glass and metal consisting essentially of:

| | Percent |
|---|---|
| SiO$_2$ | 50.13 |
| Al$_2$O$_3$ | 15.00 |
| CaO | 8.98 |
| MgO | 6.45 |
| Li$_2$O | 2.68 |
| B$_2$O$_3$ | 16.50 |
| F$_2$ | 0.50 | said glass composition having a coefficient of thermal expansion of 50.8×10$^{-7}$ and a fiber softening temperature of 720° C.

7. A sealing glass free of sodium oxide and potassium oxide for sealing to glass and metal consisting essentially of:

| | Percent |
|---|---|
| SiO$_2$ | 53.42 |
| Al$_2$O$_3$ | 13.50 |
| CaO | 11.92 |
| MgO | 8.51 |
| Li$_2$O | 2.68 |
| B$_2$O$_3$ | 10.00 | the coefficient of thermal expansion of said glass being 56.7×10$^{-7}$ and the fiber softening point being 736° C.

8. A sealing glass free of sodium oxide and potassium oxide for sealing to glass and metal consisting essentially of:

| | Percent |
|---|---|
| $SiO_2$ | 47.92 |
| $Al_2O_3$ | 13.50 |
| CaO | 11.92 |
| MgO | 8.51 |
| $Li_2O$ | 3.18 |
| $B_2O_3$ | 15.0 | the coefficient of thermal expansion of said glass being $58.2 \times 10^{-7}$ and the fiber softening point being 710° C.

9. A sealing glass free of sodium oxide and potassium oxide for sealing to glass and metal consisting essentially of:

| | Percent |
|---|---|
| $SiO_2$ | 52.92 |
| $Al_2O_3$ | 13.50 |
| CaO | 11.92 |
| MgO | 8.51 |
| $Li_2O$ | 3.18 |
| $B_2O_3$ | 10.00 | the coefficient of thermal expansion of said glass being $58.0 \times 10^{-7}$ and the fiber softening point being 727° C.

10. A method for sealing metal comprising applying to the metal surface a sealing glass free of sodium oxide and potassium oxide having high chemical durability and stability consisting essentially of:

| | Percent |
|---|---|
| $SiO_2$ | 46–56 |
| $Al_2O_3$ | 12–18 |
| CaO | 7–15 |
| MgO | 5–11 |
| $Li_2O$ | 2–3.5 |
| $B_2O_3$ | 8–18 |
| $F_2$ | 0–0.7 |

11. A method as defined in claim 10 wherein the sealing glass consists essentially of:

| | Percent |
|---|---|
| $SiO_2$ | 48.42 |
| $Al_2O_3$ | 13.50 |
| CaO | 11.92 |
| MgO | 8.51 |
| $Li_2O$ | 2.68 |
| $B_2O_3$ | 15 |
| $F_2$ | 0–0.7 |

12. A method as defined in claim 10 wherein the sealing glass consists essentially of:

| | Percent |
|---|---|
| $SiO_2$ | 49.81 |
| $Al_2O_3$ | 15 |
| CaO | 8.9 |
| MgO | 6.42 |
| $Li_2O$ | 3.00 |
| $B_2O_3$ | 16.50 |
| $F_2$ | 0.50 |

13. A method as defined in claim 10 wherein the sealing glass consists essentially of:

| | Percent |
|---|---|
| $SiO_2$ | 55.02 |
| $Al_2O_3$ | 17.26 |
| CaO | 9.26 |
| MgO | 7.31 |
| $Li_2O$ | 2.18 |
| $B_2O_3$ | 9.0 |
| $F_2$ | 0.016 |

14. A method as defined in claim 10 wherein the sealing glass consists essentially of:

| | Percent |
|---|---|
| $SiO_2$ | 50.13 |
| $Al_2O_3$ | 15.00 |
| CaO | 8.98 |
| MgO | 6.45 |
| $Li_2O$ | 2.68 |
| $B_2O_3$ | 16.50 |
| $F_2$ | 0.50 |

15. An article with at least one metal surface having sealed thereto a sealing glass of the composition defined in claim 1.

References Cited

UNITED STATES PATENTS

| 3,310,413 | 3/1967 | Harrington | 106—54 |
| 2,334,961 | 11/1943 | Schoenlaub | 106—50 |
| 2,711,975 | 6/1955 | Wainer et al. | 106—48 |
| 3,095,311 | 6/1963 | Von Wranau et al. | 106—54 |

FOREIGN PATENTS 74,747  2/1945  Czechoslovakia.

HELEN M. McCARTHY, Primary Examiner.

U.S. Cl. X.R.

106—48; 117—129; 65—59; 161—196